(12) United States Patent
Yabuta et al.

(10) Patent No.: US 7,503,581 B2
(45) Date of Patent: Mar. 17, 2009

(54) GAS GENERATOR FOR OCCUPANT RESTRAINING DEVICE FOR VEHICLE

(75) Inventors: Mikio Yabuta, Tatsuno (JP); Masayuki Ueda, Tokyo (JP)

(73) Assignee: Daicel Chemical Industries, Ltd., Sahai-shi (JP)

( * ) Notice: Subject to any disclaimer, the term of this patent is extended or adjusted under 35 U.S.C. 154(b) by 0 days.

(21) Appl. No.: 11/689,391

(22) Filed: Mar. 21, 2007

(65) Prior Publication Data

US 2007/0222195 A1 Sep. 27, 2007

Related U.S. Application Data

(60) Provisional application No. 60/786,375, filed on Mar. 28, 2006.

(30) Foreign Application Priority Data

Mar. 22, 2006 (JP) ............................. 2006-077957

(51) Int. Cl.
*B60R 21/16* (2006.01)
(52) U.S. Cl. ..................................... 280/740
(58) Field of Classification Search .................. 280/736, 280/740, 741
See application file for complete search history.

(56) References Cited

U.S. PATENT DOCUMENTS

| 5,306,041 | A | * | 4/1994 | Ogawa et al. | ................ | 280/741 |
| 6,702,323 | B2 | * | 3/2004 | Goetz | ........................... | 280/736 |
| 2005/0052006 | A1 | * | 3/2005 | Nishimura et al. | .......... | 280/736 |
| 2005/0225064 | A1 | * | 10/2005 | Suehiro et al. | .............. | 280/741 |
| 2006/0214403 | A1 | * | 9/2006 | Matsuda et al. | ............. | 280/736 |
| 2007/0063494 | A1 | * | 3/2007 | Saito et al. | ................... | 280/736 |

FOREIGN PATENT DOCUMENTS

| DE | 20 2004 001 018 U1 | 7/2004 |
| EP | 0 934 854 A1 | 8/1999 |
| EP | 1 473 202 A1 | 11/2004 |
| EP | 1661774 A1 | 5/2006 |
| JP | 09207705 A | 8/1997 |
| JP | 2005-53382 A | 3/2005 |
| WO | WO-03/066390 A1 | 8/2003 |

* cited by examiner

*Primary Examiner*—Faye M. Fleming
(74) *Attorney, Agent, or Firm*—Birch, Stewart, Kolasch & Birch, LLP

(57) ABSTRACT

The present invention provides a gas generator for an occupant restraining device of a vehicle, comprising a substantially cup-like shaped diffuser shell having a plurality of gas discharge ports on a circumferential wall portion, a substantially cup-like shaped closure shell combined with the diffuser shell to form an outer container, a housing formed by the diffuser shell and closure shell, an ignition device, a gas generating agent ignited and combusted by activation of the ignition device to generate a combustion gas, and a substantially cylindrical filter for purifying and cooling the combustion gas generated from the gas generating agent, all accommodated in the housing, the housing formed by inserting part of an outer peripheral surface in the open portion side of the closure shell into part of the inner peripheral surface of the open portion side in the diffuser shell to abut against each other, so that they are integrated, the filter supported by abutting one end surface thereof against a ceiling surface of the diffuser shell and abutting the other end surface thereof against at least an annular end surface of the open portion of the closure shell, an annular space provided between the circumferential wall having the gas discharge ports of the diffuser shell and an outer circumferential surface of the filter.

7 Claims, 4 Drawing Sheets

(a)  (b)

GAS GENERATOR FOR OCCUPANT RESTRAINING DEVICE FOR VEHICLE

This provisional application claims priority under 35 U.S.C. § 119(a) on Patent Application No. 2006-077957 filed in Japan on 22 Mar. 2006 and 35 U.S.C. § 119(e) on U.S. Provisional Application No. 60/786,375 filed on 28 Mar. 2006, which are incorporated by reference.

BACKGROUND OF INVENTION

1. Field of Invention

The present invention relates to a gas generator for a restraining device for a vehicle.

2. Description of Related Art

A gas generator for a restraining device for a vehicle is required to have small weight and size due to a limited mounting space. In particular, in a pyrotechnic gas generator that uses a solid gas generating agent, the filling quantity of the gas generating agent affects the reduction in weight and side.

The amount of solid gas generating agent that is loaded into the gas generator changes depending on the airbag volume in which the gas generator is incorporated. Thus, because the airbag volume for a passenger side is large, the loading amount of solid gas generating agent increases. If the loading amount of solid gas generating agent increases, the amount of filter used for cooling and filtering the generated combustion gas also increases, and it is difficult to reduce the weight and size of the gas generator.

In the configuration described in JP-A No. 2005-53382, a combustion chamber 5 is formed inside a housing 3 formed by an initiator shell 1 and a closure shell 2, a gas generating agent 4 is disposed therein, and a filter member 6 is disposed to surround the gas generating agent 4. The initiator shell 1 and closure shell 2 are integrated by inserting a distal end portion of a tubular section 13 of the initiator shell 1 into an annular notched section formed in the boundary portion of a flange section 12 and tubular section 9 of the closure shell 2.

The filter member 6 is disposed to extend to both sides of the initiator shell 1 and closure shell 2, the upper half thereof is disposed at a certain distance from the inner peripheral surface of a circumferential wall section of the closure shell 2, but the lower half is in contact with the inner peripheral surface of a circumferential wall section of the initiator shell 1.

SUMMARY OF INVENTION

The present invention provides a gas generator for a restraining device of a vehicle, including
a substantially cup-like shaped diffuser shell having a plurality of gas discharge ports on a circumferential wall portion,
a substantially cup-like shaped closure shell combined with the diffuser shell to form an outer container,
a housing formed by a diffuser shell and closure shell,
an ignition device, a gas generating agent ignited and combusted by activation of the ignition device to generate a combustion gas, and a substantially cylindrical filter for purifying and cooling the combustion gas generated by the gas generating agent, the ignition device, the gas generating agent, and the cylindrical filter being accommodated in the housing,
the housing formed by inserting a part of an outer peripheral surface in the open portion side of the closure shell into a part of the inner peripheral surface in the open portion side of the diffuser shell to abut against each other, so that they are integrated,
the filter supported by abutting one end surface thereof against a ceiling surface of the diffuser shell and abutting the other end surface thereof against at least an annular end surface of the open portion of the closure shell,
an annular space provided between the circumferential wall having the gas discharge ports of the diffuser shell and an outer circumferential surface of the filter.

Further, the present invention provides a gas generator for a restraining device of a vehicle, including
a substantially cup-like shaped diffuser shell having a plurality of gas discharge ports on a circumferential wall portion,
a substantially cup-like shaped closure shell combined with the diffuser shell to form an outer container,
a housing formed by a diffuser shell and closure shell,
an ignition device, a gas generating agent ignited and combusted by activation of the ignition device to generate a combustion gas, and a substantially cylindrical filter for purifying and cooling the combustion gas generated by the gas generating agent, the ignition device, the gas generating agent, and the cylindrical filter being accommodated in the housing,
the housing formed by inserting a part of an outer peripheral surface in the open portion side of the closure shell into a part of the inner peripheral surface in the open portion side of the diffuser shell to abut against each other, so that they are integrated, an annular retainer disposed inside the housing and having at least one annular surface thereof supported by an annular end surface of the open portion of the closure shell,
the filter supported by abutting one end surface thereof against the ceiling surface of the diffuser shell and abutting the other surface against another annular surface of the annular retainer,
an annular space obtained between the circumferential wall having the gas discharge ports of the diffuser shell and an outer circumferential surface of the filter.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
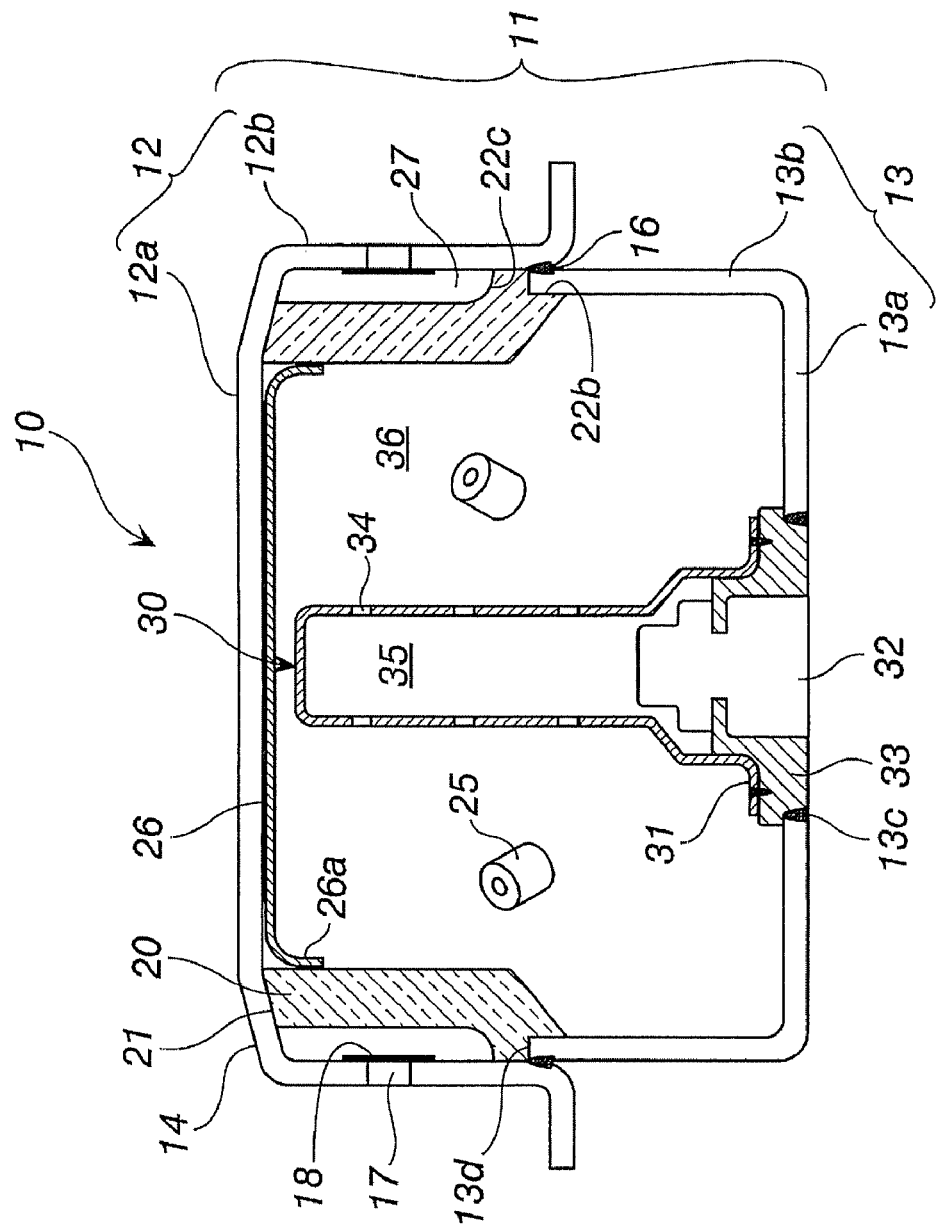
FIG. 1 is a vertical sectional view of the gas generator in accordance with the present invention.

In JP-A No. 2005-53382, the filter is disposed to extend to both sides of the initiator shell 1 and closure shell 2, but filtering and cooling function is mainly demonstrated by the half of the filter located at the side of the closure shell 2. Thus, the presence of filter that is not used sufficiently to demonstrate the filtering and cooling function becomes an obstacle for size and weight reduction.

The present invention provides a gas generator for a restraining device for a vehicle in which sufficient filtering and cooling efficiency can be demonstrate at a smaller filter amount by modifying the mounting structure of a filter for a gas generating agent.

The diffuser shell and closure shell used in accordance with the present invention have an almost cup-like shape. No specific limitation is placed on the sectional shape thereof in the width direction and axial direction, and the sectional shape in the width diction can be round, elliptical, or quadrangular with rounded corners. The filter used in the present invention has a well-known structure and is formed with a well-known material, and the thickness, height (length), and width (diameter) thereof are set according to the gas generator used.

The housing is formed by inserting an open portion of the substantially cup-like shaped closure shell into an open portion of the substantially cup-like shaped diffuser shell. The inner wall surface in the vicinity of the open portion of the diffuser shell and the outer wall surface in the vicinity of the open portion of the closure shell are brought into contact with each other over the entire circumference and the diffuser shell and closure shell are welded and integrated in the contact portion.

Since the open portion of the closure shell is thus inserted into the open portion of the diffuser shell, the annular end surface of the open portion of the closure shell is positioned inside the diffuser shell. The annular end surface of the open portion of the closure shell may be equal in thickness to the closure shell itself, or may be slightly thicker than other portions of the closure shell to support the filter. For example, an annular end surface may be formed thicker than other portions by bending the entire circumferential edge of the open portion of the closure shell or part thereof inwardly or outwardly.

In accordance with the present invention, because one end surface of the filter is supported by the annular end surface of the open portion of the closure shell, the height of the filter can be made equal to the height of the diffuser shell, without changing the filter thickness or using a separate support member such as a retainer. Therefore, the filter weight can be reduced. Further, because an annular space is present between a circumferential wall portion of the diffuser shell having the gas discharge ports and the outer peripheral surface of the filter, the filtering and cooling function is conducted in the entire portion of the filter. On the other hand, when the initiator shell 1 and closure shell 2 are joined in the annular notched section as described in JP-A No. 2005-53382, the contact surface area with the other end surface of the filter decreases in the portion of the initiator shell 1 corresponding to the annular end surface, the filter is difficult to be supported, and the above-described annular space is difficult to be formed.

The "annular space" in accordance with the present invention acts so as to enable the passage of the combustion gas over the entire region of the filter. Therefore, another member may be disposed in the entire annular space or part thereof, provided that a similar function can be conducted. For example, a member (for example, a laminated wire mesh having coarse meshes) that has a small bulk density (that is, a small air permeation resistance) may be disposed in the entire annular space or part thereof, or a filter, having an outer diameter such that the outer peripheral surface is in contact with the gas discharge port and having smaller bulk density in the vicinity of the outer peripheral surface of the filter (that is, air permeation resistance is reduced), may be also disposed. In such cases, the weight is somewhat increased, but the alignment of the filter is facilitated and the radial displacement of the filter can be prevented.

Further, the present invention preferably provides the gas generator for a restraining device for a vehicle, wherein
the filter is supported by abutting one end surface thereof against a ceiling surface of the diffuser shell and abutting the other end surface against three surfaces including an inner peripheral surface of an open portion of the diffuser shell, an annular end surface of the open portion of the closure shell, and an inner peripheral surface on an open portion of the closure shell, and
an annular space is provided between a circumferential wall portion of the diffuser shell having gas discharge ports and an outer peripheral surface of the filter.

By supporting the other end surface of the filter with the above-described three surfaces, the contact surface area can be increased compared with that of the case where the other end surface of the filter is supported only by the annular end surface of the open portion of the closure shell. Therefore, the support strength of the filter is increased. Further, because the width of the annular end surface of the open portion of the closure shell can be decreased (that is, the closure shell thickness can be decreased within a range in which the necessary pressure resistance can be maintained), the weight can be additionally reduced. Further, the contact surface of the other end surface of the filter with the closure shell or diffuser shell has a complex shape, and the short-pass of the combustion gas is more prevented.

The other end surface of the filter that is in contact with these three surfaces may be processed to a predetermined shape in advance, or may be deformed by strongly pressing it against the three surfaces. If the other end surface of the filter is processed to a predetermined shape in advance, the filter mounting operation and the overall assembling operation are facilitated.

Further, the present invention preferably provides the gas generator for a restraining device for a vehicle, wherein
the filter is vertically compressed by the ceiling surface of the diffuser shell and the annular end surface of the open portion of the closure shell.

If the filter is thus vertically compressed, the tightness of contact between the two end surfaces of the filter and the ceiling surface of the diffuser shell and the annular end surface of the open portion of the closure shell can be increased. Therefore, when the gas generator is actuated, it is possible to prevent the occurrence of short-pass by which the generated combustion gas leaks from the contact zones of the filter end surfaces and the ceiling surface of the diffuser shell and the annular end surface of the open portion of the closure shell, without passing through the filter. Furthermore, because the filter is fixed inside the housing, without play, the occurrence of noise or filter displacement caused by vibrations can be prevented.

The other invention is differentiated from the above in terms of the filter supported by the retainer. By supporting the filter with the annular retainer, the contact surface area with the filter end surface can be increased. Therefore, the filter is supported sufficiently, the filter can be mounted in an easier manner, and the short pass prevention effect is improved. One annular surface of the retainer is supported by the annular end surface of the open portion of the closure shell, but the retainer is not in contact with the bottom surface of the closure shell.

The "annular space" in accordance with the present invention acts so as to enable the passage of the combustion gas over the entire region of the filter. Therefore, another member may be disposed in the entire annular space or part thereof, provided that a similar function can be conducted. For example, a member (for example, a laminated wire mesh having coarse meshes) that has a small bulk density (that is, a small air permeation resistance) may be disposed in the entire annular space or part thereof, or a filter, having an outer diameter such that the outer peripheral surface is in contact with the gas discharge port and having the smaller bulk density in the vicinity of the outer peripheral surface of the filter (that is, air permeation resistance is reduced), may be also disposed. In such cases, the weight is somewhat increased, but the alignment of the filter is facilitated and the radial displacement of the filter can be prevented.

Further, the present invention preferably provides the gas generator for a restraining device for a vehicle, wherein the annular retainer has an outer annular surface and an inner annular surface formed by providing a step with respect to the outer annular surface, the outer annular surface is supported on the annular end surface of the open portion of the closure shell, and the other end surface of the filter is supported on at least the inner annular surface.

The retainer, as described above, can have an outer annular surface, an inner annular surface, and a surface (annular wall surface) formed in the step portion of the outer and inner annular surfaces. When such a retainer is used, the other end surface of the filter may be supported only by the inner annular surface, but if it is brought into contact with and supported by three surfaces: the entire outer annular surface or part thereof, annular wall surface, and inner annular surface, the support strength and short pass prevention effect are improved. The other end surface of the filter that comes into contact with the three surfaces is processed to the predetermined shape in advance. A part of the filter circumferential surface is abutted against the inner circumferential wall of the diffuser shell, thereby increasing the fixing strength of the filter.

When such a retainer is used, the short pass is prevented by the contact surface of the filter with three surfaces: outer annular surface, annular wall surface, and inner annular surface. If a sufficient short pass prevention effect can be ensured with the annular wall surface and inner annular surface, in order to reduce weight, the outer annular surface can be made discontinuous structure (that is, formed by a plurality of independent portions), rather than that of a continuous annular shape, and supported on the annular end surface.

Further, the present invention preferably provides the gas generator for a restraining device for a vehicle, wherein the filter is vertically compressed by the ceiling surface of the diffuser shell and the annular retainer.

If the filter is thus vertically compressed, the short pass prevention effect can be further improved.

In the gas generator in accordance with the present invention, by improving the mounting structure of the filter that performs filtering and cooling of the combustion gas, the amount of filter can be reduced, while maintaining sufficient filtering and cooling function, whereby the entire gas generator can be reduced in weight and size.

The present invention includes the following aspect. That is, the present invention provides a gas generator for a restraining device for a vehicle, comprising:

a substantially cup-shaped diffuser shell having a plurality of gas discharge ports and an open portion, a substantially cup-shaped closure shell having an open portion and combined with the diffuser shell to form an outer container, a housing formed by inserting an inner peripheral surface of the open portion of the diffuser shell into the outer peripheral surface of the open portion of the closure shell to abut against each other, an ignition device, a gas generating agent combusted by activation of the ignition device to generate combustion gas, a substantially cylindrical filter for purifying and cooling the combustion gas, and a retainer supporting a lower end surface of the filter, the ignition device, the gas generating agent, and the cylindrical filter being accommodated in the housing, the retainer comprising a first disk portion abutting against the closure shell, an annular portion extending from the first disk portion and abutting against the lower peripheral wall surface of the filter and a second disk portion extending from the annular portion and abutting against the lower end surface of the filter, the filter supported by abutting an upper end surface thereof against the ceiling surface of the diffuser shell and abutting the lower end surface thereof against the second disk portion, and the lower end surface thereof positioned with a distance from a bottom plate of the closure shell, an annular space provided between the circumferential wall portion of the housing and outer peripheral surface of the filter.

Figure 3:
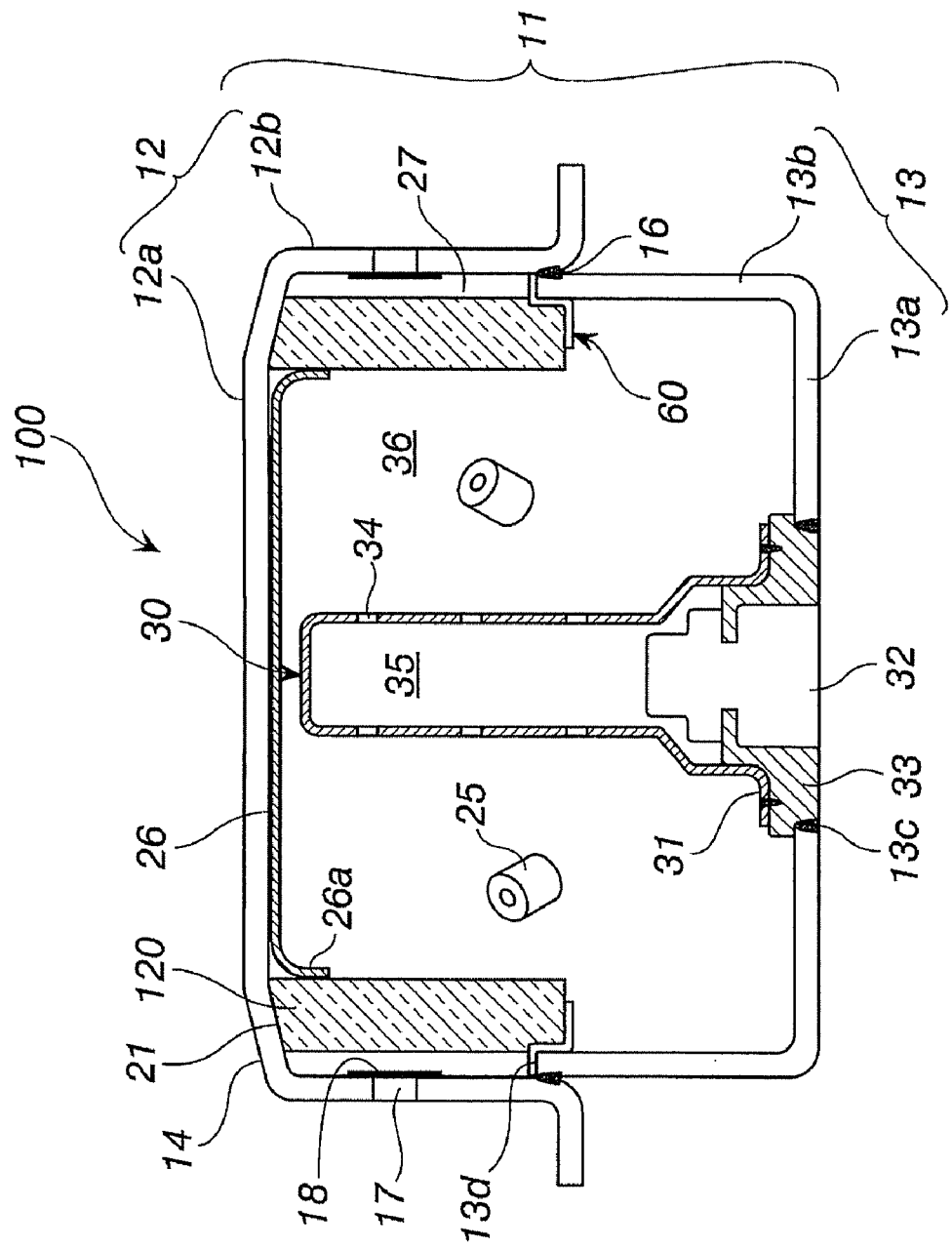
FIG. 3 is a vertical sectional view of the gas generator that is another embodiment of the present invention.

In the above aspect, for example, the first disk portion corresponds to the outer annular portion 61, the annular portion corresponds to the annular wall surface 62 and the second disk portion corresponds to the inner annular surface 63 in FIG. 3.

In the above aspect, it is preferable that the second disk plate portion disposed between the lower end surface of the filter and bottom plate of the closure shell, having a distance from the bottom plate of the closure shell, and the filter is compressed vertically only by the ceiling surface of the diffuser shell and the retainer.

And, the upper end surface of the filter preferably abuts against the annular slope formed in the ceiling surface of the diffuser shell.

Further, preferably, the holding retainer for preventing short-pass of combustion gas is disposed to abut against the ceiling surface of the diffuser shell and the inner peripheral surface of the upper end portion of the filter.

Figure 2:
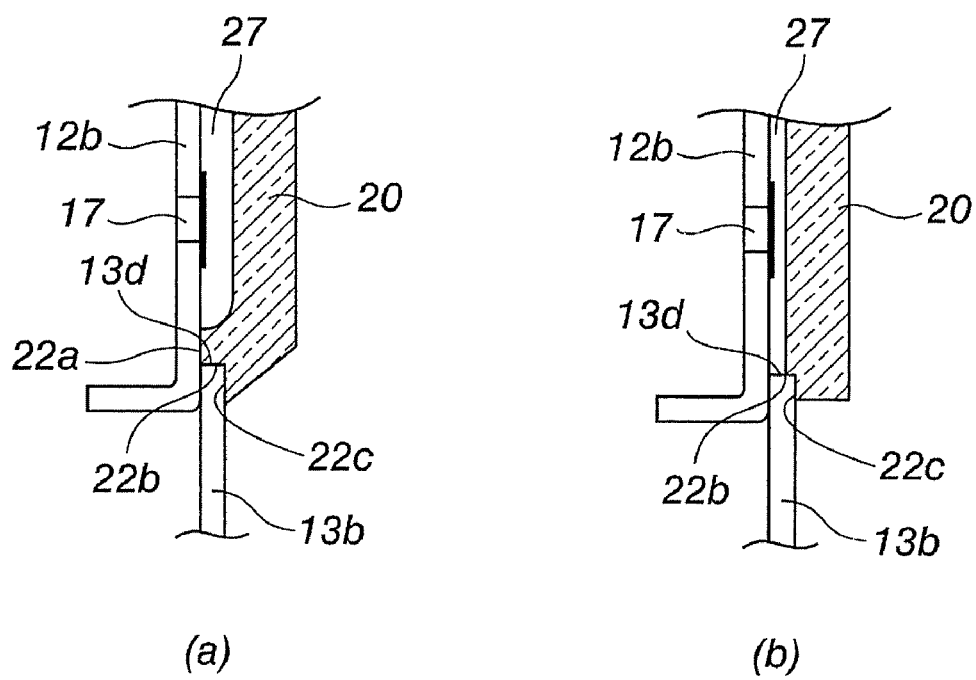
FIG. 2(a) is a partial cross-sectional view of the gas generator shown in FIG. 1.
FIG. 2(b) is a particle cross-sectional view of another embodiment.

Embodiments of Invention (1) Gas Generator Shown in FIG. 1 and FIG. 2.

The embodiments of the present invention will be described below based on the drawings. FIG. 1 is a sectional view in the axial direction of the gas generator in accordance with the present invention. FIG. 2(*a*) is a partial sectional view of the gas generator shown in FIG. 1. FIG. 2(*b*) is a partial sectional view of the embodiment other than that shown in FIG. 2(*a*).

In a gas generator 10 of FIG. 1, an outer shell container is formed by a housing 11 obtained by joining a diffuser shell 12 and a closure shell 13.

The diffuser shell 12 is in a cup-like shape having a round cross section in the width direction thereof and has a top plate 12*a*, a circumferential wall 12*b*, and an open portion at the opposite side of the top plate 12*a*.

The prescribed number of gas discharge ports 17 are provided in the circumferential wall 12*b* of the diffuser shell 12, and the ports are sealed with an aluminum seal tape 18 to prevent moisture penetration. A plurality of gas discharge ports 17 has the same diameter, but they may have different diameters.

An upper annular slope 14 is provided in the boundary portion of the top plate 12*a* and circumferential wall 12*b* of the diffuser shell 12. The upper annular slope 14 may be flat or curved, and the shape thereof is set to be similar to the shape obtained when the housing 11 is expanded by the increasing inner pressure during actuation of the gas generator 10. Therefore, the upper annular slope 14 undergoes practically no deformation during actuation of the gas generator 10.

The closure shell 13 is in a cup-like shape having a round cross section in the width direction thereof and has a bottom plate 13a and a circumferential wall 13b. An opening 13c for mounting an igniter 32 or the like is provided in the bottom plate 13a, and an open portion is provided at the opposite side of the bottom plate 13a. The outer diameter of the closure shell 13 is adjusted to be almost equal to or slightly less than the inner diameter of the diffuser shell 12.

The diffuser shell 12 and closure shell 13 are joined together by inserting the closure shell 13 into the open portion of the diffuser shell 12, abutting the outer peripheral surface of the upper end section of the circumferential wall 13b against the inner peripheral surface of the lower end section of the circumferential wall 12b, and then joining the contact portion (welded portion) 16 by laser welding. The annular end surface 13d of the open portion of the closure shell 13 is present inside the housing 11. The depth and surface area of the welded portion or the contact surface area of the inner peripheral surface of the lower end section of the circumferential wall 12b and the inner peripheral surface of the upper end section of the circumferential wall 13b are set within the range providing for a joint strength that can ensure pressure resistance required for a gas generator.

A cylindrical filter 20 that performs filtering and cooling functions when the gas generator 10 is actuated is disposed inside the housing 11. The conventional filter may be used as the cylindrical filter 20, which has elasticity and is substantially obtained by knitting plain weave wire mesh into multiple layers and compressing in a die, or obtained by winding a single wire rod continuously to have multiple layers.

An upper end surface 21 of the cylindrical filter 20 shown in FIG. 1 and FIG. 2(a) is an inclined surface that abuts against the upper annular slope 14. The entire upper end surface 21 may be in contact with the upper annular slope 14, or part of the upper end surface may be in contact with the top plate 12a. In order to improve the short pass prevention effect, it is preferred that 80% or more of the total surface area of the upper end surface 21 be in contact with the upper annular slope 14.

The lower end surface of the cylindrical filter 20 shown in FIG. 1 and FIG. 2(a) is processed to the predetermined shape in advance, a lower end surface 22a abuts against the inner peripheral surface of the circumferential wall section 12b, a lower end surface 22b abuts against the annular end surface 13d, and a lower end surface 22c abuts against the inner peripheral surface of the circumferential wall section 13b.

In the cylindrical filter 20 shown in FIG. 2(b), the upper end surface is identical to that shown in FIG. 1, the lower end surface 22b abuts against the annular end surface 13d, and the lower end surface 22c abuts against the inner peripheral surface of the circumferential wall section 13b.

The height of the cylindrical filter 20 in the axial direction is almost equal to the height of the circumferential wall section 12b of the diffuser, and the cylindrical filter is so disposed that an annular space 27 is present between the filter and the circumferential wall section 12b (gas discharge ports 17) of the diffuser 12. Under the effect of the annular space 27, the generated gas passes through the entire region of the cylindrical filter 20. Therefore, the filtering and cooling effect of the generated gas is improved.

In the present embodiment, a round holding retainer 26 is inserted to abut against the inner surface of the top plate 12a in order to prevent the cylindrical filter 20 from shifting under the effect of external vibrations and to prevent short-pass of the combustion gas from the upper end surface 21 of the filter 20. The holding retainer 26 also functions to prevent the upper end surface 21 from falling inwardly when the filter 20 is vertically clamped between the diffuser shell 12 and closure shell 13 at the time of assembling of the gas generator 10.

In the holding retainer 26, an annular portion 26a, which is formed integrally with the peripheral edge of a round plate portion of the retainer 26, abuts against the inner peripheral surface of the upper end surface 21 of the cylindrical filter 20. And, the round plate portion of the retainer abuts against the inner surface of the top plate 12a, which prevents the short-pass of the combustion gas between the upper end surface 21 of the cylindrical filter 20 and the upper annular slope 14 formed in the top plate 12a.

A tubular member 30 closed at one end is disposed inside the housing 11 so as to be concentric with the housing 11 and have a distance from the holding retainer 26. The tubular member 30 has a flange portion 31, and the flange portion 31 is fixed by welding to a metal collar 33 of an electric igniter 32. The metal collar 33 is fixed by welding to an opening 13c of the closure shell 13.

The inner space of the tubular member 30 serves as a first combustion chamber 35, and the outer space thereof serves as a second combustion chamber 36. A prescribed amount of a gas generating agent (not shown in the drawing) for a flame-transferring and the electric igniter 32 provided with an igniting agent, which serve as an ignition device, are accommodated inside the first combustion chamber 35.

The gas generating agent for flame-transferring is ignited and combusted by the actuation of the igniter 32 to ignite and combust the gas generating agent 25 and generate the gas serving as an airbag inflation medium. In addition, the gas generated by the combustion of the gas generating agent for flame-transferring is also used for inflating the airbag. By using a gas generating agent for flame-transferring that has a combustion temperature higher than that of the gas generating agent 25, the gas generating agent 25 can be ignited with good reliability.

A composition obtained by mixing nitroguanidine as a fuel, strontium nitrate as an oxidizing agent, and also sodium salt of carboxymethyl cellulose as a binder and an Japanese acid clay as a residue trapping agent can be used as the gas generating agent for flame-transferring. A composition obtained by mixing guanidine nitrate as a fuel, basic copper oxide or nitrate as an oxidizing agent, and also sodium salt of carboxymethyl cellulose as a binder and aluminum hydroxide as a cooling agent can be used as the gas generating agent 25.

A plurality of communication holes 34 are provided in the circumferential wall portion of the tubular member 30 so as to be equidistantly spaced in the circumferential direction and axial direction, and the first combustion chamber 35 and second combustion chamber 36 are communicated with each other by the communication holes 34. The communication holes 34 are sealed from the outside with an aluminum seal tape. Because of such an arrangement of communication holes 34, the flame and high-temperature gas generated from the first combustion chamber 35 propagate uniformly inside the second combustion chamber 36. Therefore the ignition ability of the gas generating agent 25 is improved.

The size or arrangement of the communication holes 34 may be non-uniform, provided that the same effect is obtained. For example, the communication holes 34 located close to the igniter 32 can be smaller, the communication holes 34 far from the igniter 32 can be larger, or the communication holes 34 can be provided unevenly, concentrating on the locations far from the igniter 32.

A method for assembling the gas generator 10 shown in FIG. 1 and FIG. 2(a) will be described below. First, the igniter 32 (after it has been mounted on the metal collar 33) is fixed by welding to an opening 13c of the closure shell 13.

Then, the tubular member 30 charged with the gas generating agent for flame-transferring is fixed by welding to the metal collar 33 of the igniter 32 (the flange portion 31 is fixed by welding to the metal collar 33). In this state, the cylindrical filter 20 is fitted onto the annular end surface 13d of the closure shell 13.

Then, the prescribed quantity of the gas generating agent 25 is charged into the second combustion chamber 35 surrounded by the closure shell 13, cylindrical filter 20, and tubular member 30, the holding retainer 26 is placed thereon from above, and finally the diffuser shell 12 is fitted on the outside of the closure shell 13. In the state that the diffuser shell 12 is pushed in the direction of the closure shell 13 and the cylindrical filter 20 is slightly compressed in the axial direction, laser welding is performed in the welding section 16.

By attaching the cylindrical filter 20 to the inside of the housing 11 in such a manner, the upper annular slope 14 is strongly abutted against the upper end surface 21 of the filter. Because the cylindrical filter 20 is disposed in a state in which it is compressed in the axial direction, the upper annular slope 14 and annular end surface 13d are pressed by the repulsion force of the filter. As a result, short-pass of the combustion gas from the contact surface between the upper annular slope 14 and the upper end surface 21, and from the contact surfaces of the annular end surface 13d, the surfaces adjacent thereto, and lower end surfaces 22a-22c.

The annular end surface 13d is a flat surface, but the annular end surface 13d may have a convex section (pointed portion), so that when the cylindrical filter 20 is compressed in the axial direction, the lower end surface of the cylindrical filter 20 is embedded into the peaked portion.

The shape of the upper annular slope 14 is set to be identical to that after inflation and deformation induced by the actuation of gas generator 10. Therefore, the abutment state of the upper end surface 21 of the cylindrical filter 20 does not change and the sealing performance of the upper end surface 21 of the cylindrical filter 20 is maintained.

The operation of the gas generator in accordance with the present invention assembled with an airbag apparatus of an automobile will be described below with reference to FIG. 1 and FIG. 2(a).

When an automobile collides, a command is received from a impact sensor, the igniter 32 is actuated, the gas generating agent for flame-transferring that is located inside the first combustion chamber 35 is ignited and combusted, and flame and high-temperature gas are generated. The flame and high-temperature gas are ejected from a plurality of the communication holes 34 (the seal tape closing the communication holes 34 is ruptured) that are provided at the tubular member 30 into the second combustion chamber 36, the gas generating agent 25 is ignited and combusted, and a gas serving as an airbag inflation medium is generated.

The combustion gas is filtered and cooled when passing through the entire region of the cylindrical filter 20, ruptures the seal tape 18, is discharged from the gas discharge ports 17, and inflates the airbag.

At this time, the upper annular slope 14 of the gas generator 10 shown in FIG. 1 is not deformed, and during passage of the combustion gas, the cylindrical filter 20 expands outwardly, but the inclined upper end surface 21 of the cylindrical filter 20 is strongly pressed, by this force, against the upper annular slope 14, whereby short-pass of gas therebetween is prevented. Further, short-pass of the gas between the upper end surface 21 of the cylindrical filter 20 and the upper annular slope 14 is prevented by the holding retainer 26. And, at the lower end surfaces 22a to 22c of the filter, the lower end surface 22a and lower end surface 22c are also pressed against the inner surface of the circumferential wall surface 12b of the diffuser shell and the inner surface of the circumferential wall surface 13b of the closure shell, thereby preventing short-pass of the combustion gas.

Figure 4:
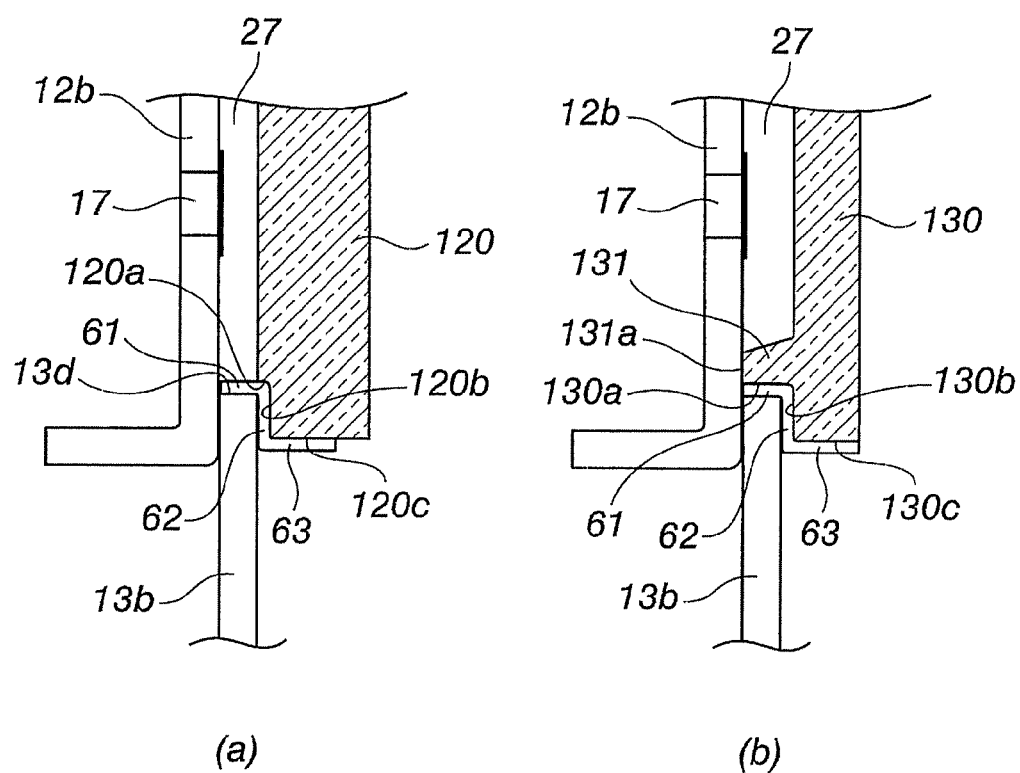
FIG. 4(a) is a partial cross-sectional view of the gas generator shown in FIG. 4.
FIG. 4(b) is a particle cross-sectional view of another embodiment.

(2) Gas Generator Shown in FIG. 3 and FIG. 4

FIG. 3 is a vertical cross-sectional view of a gas generator 100 that has a mounting structure of the cylindrical filter different from that of the gas generator 10 shown in FIG. 1. FIG. 4(a) is a partial sectional view of the configuration shown in FIG. 3, and FIG. 4(b) is a partial sectional view of the embodiment different from that shown in FIG. 4(a). By contrast with the gas generator 10 shown in FIG. 1, in the gas generator 100 shown in FIG. 3, a cylindrical filter 120 or filter 130 is supported on an annular retainer 60. The reference numeral identical to those in FIG. 1 denote the same components. In particular, the cylindrical filter 120 or 130 is disposed such that the upper end surface 21 thereof are directly compressed only by the top plates 12a of the diffuser shell, and the lower end surfaces 120c and 130c are directly compressed only by the retainers 60, all in the axial direction (vertically).

The annular retainer 60 has an outer annular surface 61 and an inner annular surface 63 which is formed with a step with respect to the outer annular surface 61, and an annular wall surface 62 that is an almost vertical wall surface is provided between the outer annular surface 61 and inner annular surface 63.

The annular retainer 60 has an outer diameter almost equal to the inner diameter of the diffuser shell 12. The outer annular surface 61 abuts from above against the annular end surface 13d in a state where the distal end section of the outer annular surface abuts against the inner peripheral surface of the circumferential wall 12b, and the annular wall surface 62 is supported by abutting against the inner peripheral surface of the circumferential wall 13b.

The lower end surface of the cylindrical filter 120 shown in FIG. 4(a) is processed to a predetermined shape in advance and supported by abutting a lower end surface 120a against part of the outer annular surface 61, abutting a lower end surface 120b against the annular wall surface 62, and abutting a lower end surface 120c against the inner annular surface 63.

The cylindrical filter 130 shown in FIG. 4(b) has an annular protruding portion 131 in the lower portion, and an outer peripheral section 131a of the annular protruding portion 131 is pressed against the inner peripheral surface of the circumferential wall 12b. The lower end surface of the cylindrical filter 130 is processed to a predetermined shape in advance and supported by abutting a lower end surface 130a against the outer annular surface 61, abutting a lower end surface 130b against the annular wall surface 62, and abutting a lower end surface 130c against the inner annular surface 63. The inner annular surface 63 does not contact the bottom plate 13a of the closure shell 13.

When such an annular retainer 60 is used, the cylindrical filter 120, 130 can be easily mounted. Moreover, because the contact surface area of the annular retainer 60 and cylindrical filter 120, 130 is increased, (the annular retainer 60 abuts against the lower end surface 120c, 130c of the cylindrical filter 120, 130 and part of the circumferential wall portion in the vicinity of the lower end surface 120c and 130c), the short pass prevention effect is improved. The annular retainer 60 is to prevent short-pass of combustion gas from the lower end surface 120c, 130c of the cylindrical filter 120, 130, and as long as this function can be obtained, the annular retainer is not limited to the structure described in this embodiment.

In the holding retainer 26, like the embodiment shown in FIG. 1, an annular portion 26a, which is formed at the peripheral edge of the round plate portion, abuts against inner peripheral surface of the upper end surface 21 of the cylindrical filter 120, 130. And the round plate portion abuts against the inner surface of the top plate 12a to prevent short-pass of combustion gas between the upper end surface 21 of the cylindrical filter 120, 130 and the upper annular slope 14 formed in the top plate 12 during activation of the gas generator. The structure in which the upper end surface 21 of the cylindrical filter 120, 130 abuts against the upper annular slope 14 to prevent short-pass of combustion gas is the same as that of the embodiment shown in FIG. 1.

The present invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for an occupant restraining device of a vehicle, including
   a substantially cup-like shaped diffuser shell having a plurality of gas discharge ports on a circumferential wall portion,
   a substantially cup-like shaped closure shell combined with the diffuser shell to form an outer container,
   a housing formed by a diffuser shell and closure shell,
   an ignition device, a gas generating agent ignited and combusted by activation of the ignition device to generate a combustion gas, and a substantially cylindrical filter for purifying and cooling the combustion gas generated by the gas generating agent, the ignition device, the gas generating agent and the cylindrical filter being accommodated in the housing and forming a single ignition chamber,
   the housing formed by inserting part of an outer peripheral surface in an open portion side of the closure shell into part of an inner peripheral surface in an open portion side of the diffuser shell to abut against each other, so that they are integrated, an annular retainer disposed inside the housing and having at least one annular surface thereof supported by an annular end surface of an open portion of the closure shell,
   the filter supported by abutting one end surface thereof against a ceiling surface of the diffuser shell and abutting the other surface against another annular surface of the annular retainer,
   a annular space obtained between the circumferential wall portion having the gas discharge ports of the diffuser shell and an outer circumferential surface of the filter.

2. The gas generator for an occupant restraining device for a vehicle according to claim 1, wherein
   the annular retainer has an outer annular surface and an inner annular surface formed by providing a step with respect to the outer annular surface, the outer annular surface is supported on the annular end surface of the open portion of the closure shell, and the other end surface of the filter is supported on at least the inner annular surface.

3. The gas generator for an occupant restraining device for a vehicle according to claim 1 or 2, wherein
   the filter is vertically compressed by the ceiling surface of the diffuser shell and the annular retainer.

4. A gas generator for an occupant restraining device for a vehicle, comprising
   a substantially cup-shaped diffuser shell having a plurality of gas discharge ports and an open portion,
   a substantially cup-shaped closure shell having an open portion and combined with the diffuser shell to form an outer container, a housing formed by inserting an inner peripheral surface of the open portion of the diffuser shell into an outer peripheral surface of the open portion of the closure shell to abut against each other,
   an ignition device, a gas generating agent combusted by activation of the ignition device to generate combustion gas, a substantially cylindrical filter for purifying and cooling the combustion gas, and a retainer supporting a lower end surface of the filter, the ignition device, the gas generating agent, and the cylindrical filter being accommodated in the housing,
   the retainer comprising a first disk portion abutting against the closure shell, an annular portion extending from the first disk portion and abutting against a lower peripheral wall surface of the filter and a second disk portion extending from the annular portion and abutting against the lower end surface of the filter,
   the filter supported by abutting an upper end surface thereof against a ceiling surface of the diffuser shell and abutting the lower end surface against the second disk portion, and the lower end surface thereof positioned with a distance from a bottom plate of the closure shell,
   an annular space provided between the circumferential wall portion of the housing and outer peripheral surface of the filter.

5. The gas generator for an occupant restraining device according to claim 4, wherein the second disk portion disposed between the lower end surface of the filter and bottom plate of the closure shell, having the distance from the bottom plate of the closure shell, and the filter is compressed vertically only by the ceiling surface of the diffuser shell and the retainer.

6. The gas generator for an occupant restraining device according to claim 5, wherein the upper end surface of the filter abuts against an annular slope formed in the ceiling surface of the diffuser shell.

7. The gas generator for an occupant restraining device according to any one of claims 4 to 6, wherein a holding retainer for preventing short-pass of combustion gas is disposed to abut against the ceiling surface of the diffuser shell and an inner peripheral surface of an upper end portion of the filter.

* * * * *